Nov. 16, 1943.  M. S. CURTIS  2,334,544
MACHINE TOOL
Original Filed June 8, 1938  5 Sheets-Sheet 1

Inventor
MYRON S. CURTIS,
By [signature]
Attorney

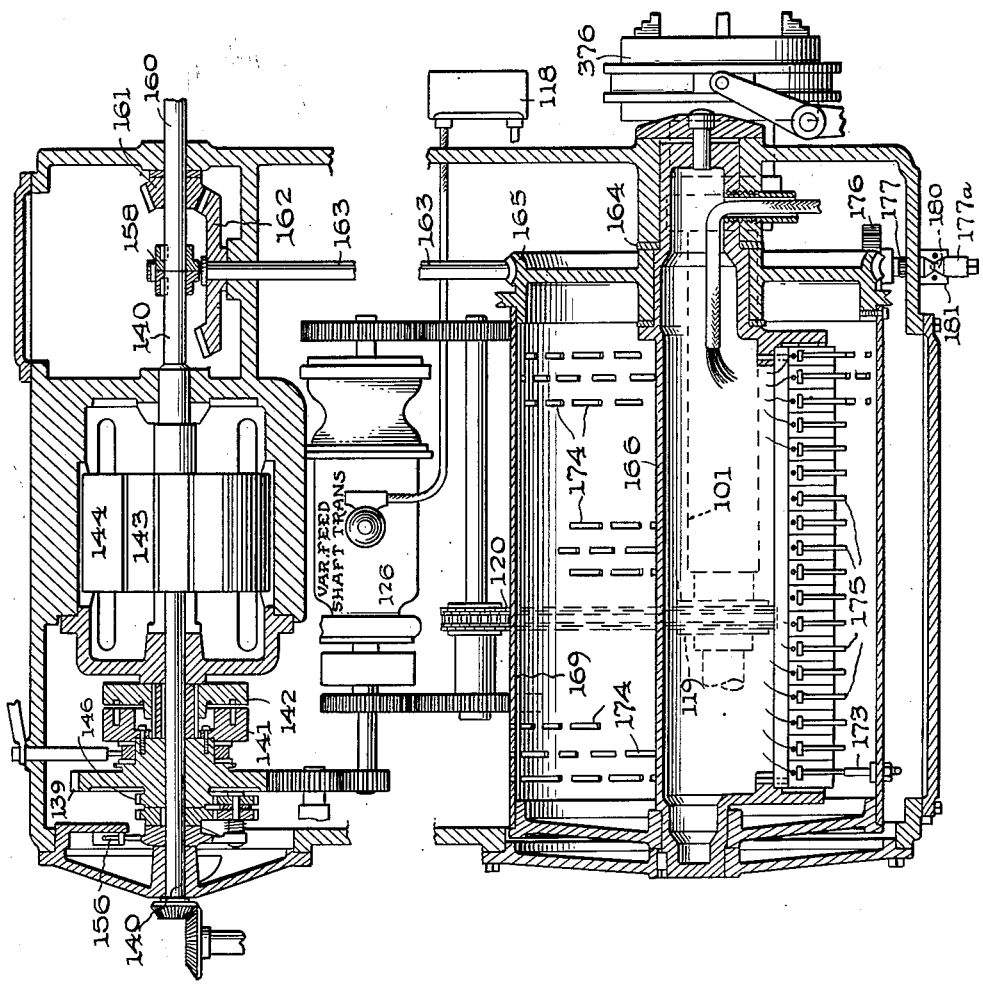

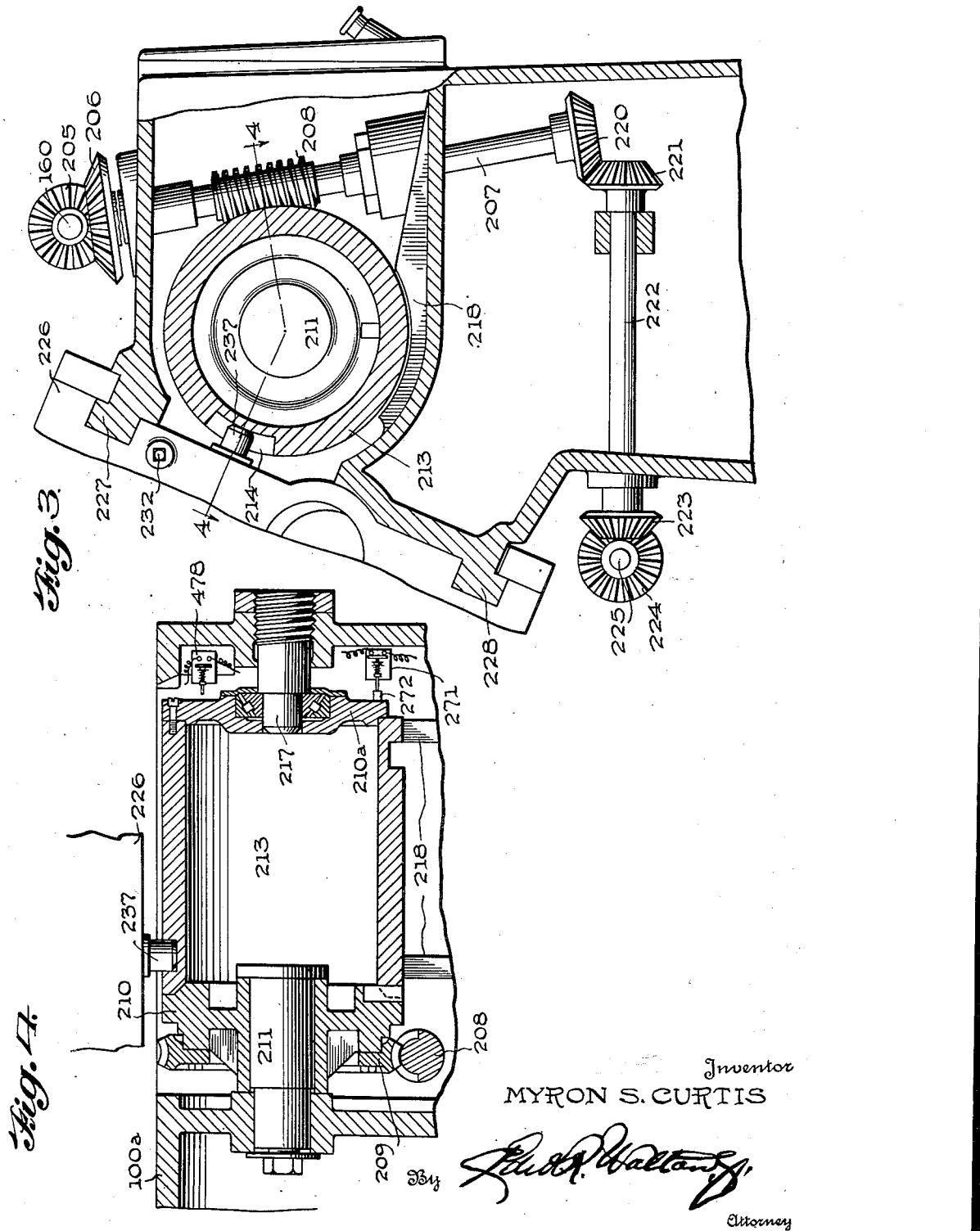

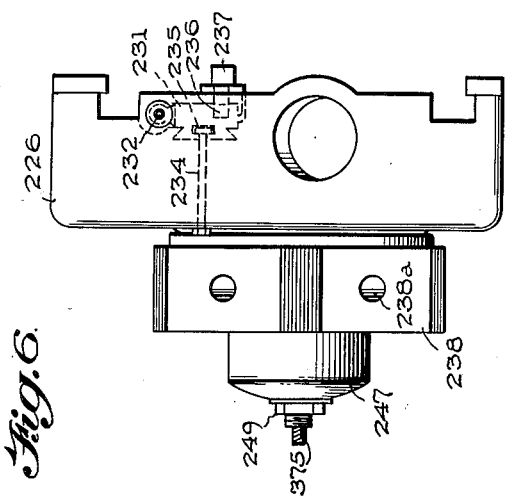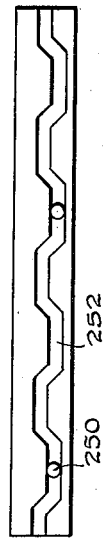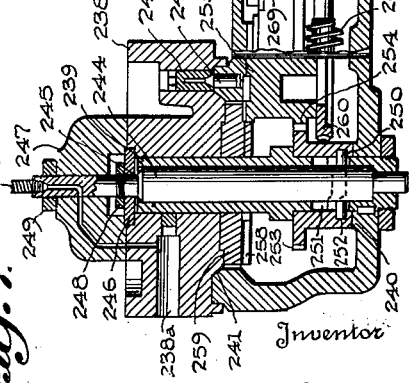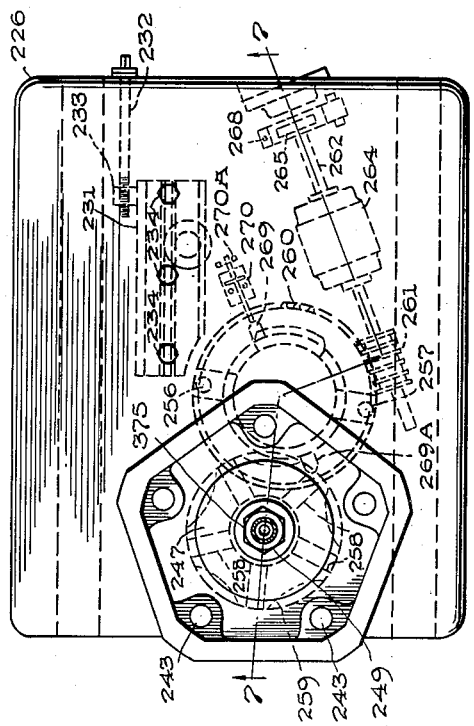

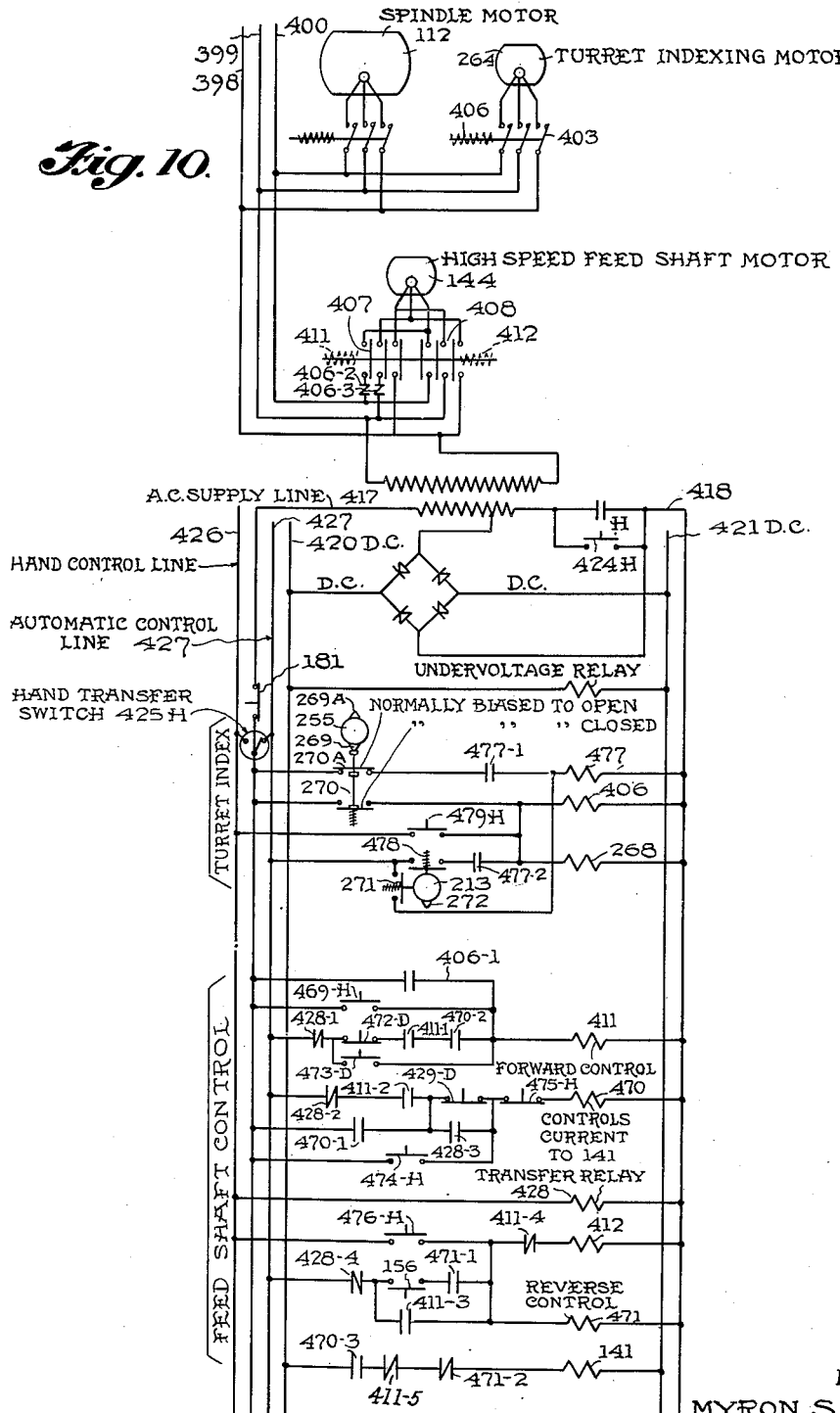

Patented Nov. 16, 1943

2,334,544

UNITED STATES PATENT OFFICE 2,334,544

MACHINE TOOL

Myron S. Curtis, Pawtucket, R. I., assignor to Potter & Johnston Machine Company, Pawtucket, R. I., a corporation of Rhode Island Original application June 8, 1938, Serial No. 212,565, now Patent No. 2,255,739, dated September 9, 1941. Divided and this application August 26, 1941, Serial No. 408,381

13 Claims. (Cl. 29—50)

The present invention relates to machine tools of the turret lathe type and is particularly concerned with the improvements in the turret slide and turret indexing mechanism, this application being a division of copending application Serial No. 212,565, filed June 8, 1938, now Patent No. 2,255,739, granted September 9, 1941.

In practically all machines of this type, there are two functions to be accomplished: First, the rotation of the tool or work: and, secondly, the feeding or movement of the tool and work with respect to each other. For the purpose of illustrating the invention herein, the principal detailed description refers particularly to where the work or work holder (hereinafter referred to as the spindle) rotates and where the tool holder or holders (hereinafter called the "slide") are moved with reference to the spindle for the purpose of doing work (this movement hereinafter called the "feed"), it being understood, however, that I do not limit myself to this adaptation as the spindle may carry the tools and the work fed thereto.

Broadly, the object of the invention is (1) to control the operation of the turret slide by means actuated synchronously with or from the slide operating means and by which control means the turret indexing movement may be started, but which movement is stopped from the position of the turret itself; (2) in certain cases where desirable, to stop the operation of the turret slide actuating mechanism during turret indexing and starting it when each turret index has been completed while the machine is automatically controlled; (3) to lock the turret in its indexed position including fixed co-acting members on the slide and on the turret, the turret and slide being separated so that said fixed members will not co-act during indexing; and (4) the slide operating means being reversible and the turret indexing means being rendered inoperable when the slide operating means is reversed while the machine is under hand control.

In addition to the above objects, the invention resides in sundry details of construction, organization and arrangement of parts and novel functions as will be apparent as the specification proceeds.

The invention is shown for purposes of illustration as applied to one type of machine-tool but may be applied to any where the desired functions and operations of the invention are found suitable.

In the drawings—

Figure 2 is a horizontal section taken substantially on line 2—2 of Figure 1 showing a portion of the feed shaft drive and the control dog drum;

Figure 3 is a section taken approximately on line 3—3 of Figure 1 showing the mechanism for driving the turret and its slide;

Figure 4 is a section taken on line 4—4 of Figure 3;

Figure 5 is a plan elevation of the turret and its slide;

Figure 6 is an end elevation of Figure 5;

Figure 7 is a section through Figure 5 substantially on the line 7—7 thereof;

Figure 8 is a detail of the brake for turret index motor;

Figure 9 is a developed view of the binder cam for raising and lowering turret; and Figure 10 is a wiring diagram for the controls of the machine with which this application is concerned.

Throughout the specification and drawings, like characters of reference designate like and corresponding parts.

Figure 1:
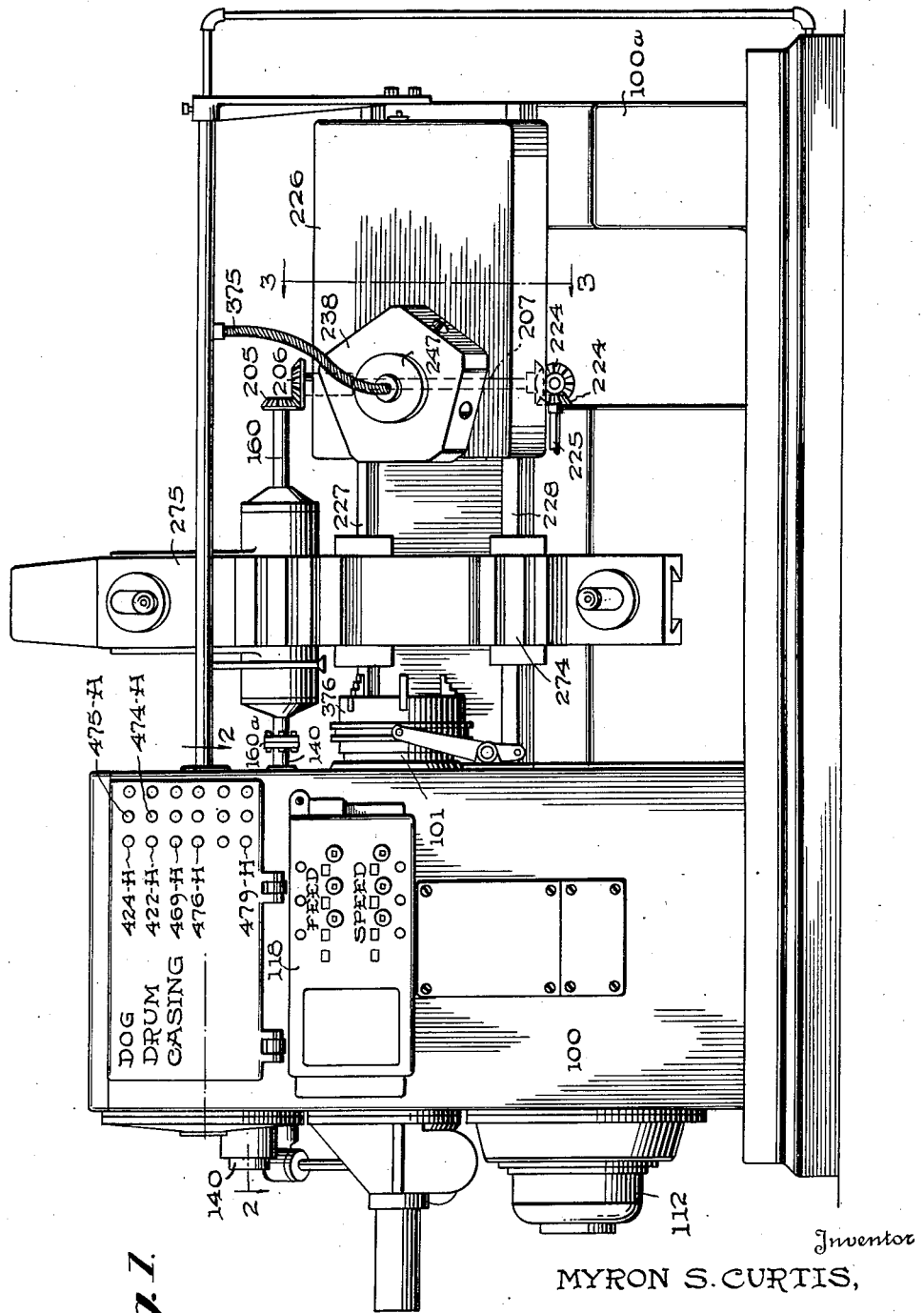
Figure 1 is a front elevation of a turret lathe.

The machine tool shown in Figure 1 is an automatic turret lathe, its operation being controlled electrically as disclosed in said co-pending application. A spindle 101 is mounted in the head-stock of the machine and has on its outer end a chuck 376, of a well known type, for holding the work or specimen to be operated upon in cooperative relation with the turret slide 226 mounted for to and fro movement with respect to the chuck end of the spindle.

The spindle is driven by an electrical motor 112 mounted in the head-stock casing 100 through a mechanism shown particularly in Figure 10 of my co-pending application, aforesaid, and which includes an infinitely variable speed changing device controlled by a pre-selector mechanism 118.

The turret slide 226 and the cross slides 274 and 275 are actuated from a feed shaft 160 which is driven from the spindle 101, shown in said co-pending application. When clutch magnet 141 is de-energized and motor 144 is energized (Fig. 2), shaft 140 is driven at a high constant speed for idle movements of the turret slide 226 and of the cross slides, but when both are de-energized shaft 140 remains stationary. If shaft 140 is running at a high speed and gear 139 at a comparatively low speed, there would be a severe shock upon the engagement of clutch 141 due to the momentum of shaft 140. Therefore, a differential switch means 156 is provided for preventing the energizing of magnet 141, except when shaft 140 and gear 139 are running approximately at the same speed, as described in my aforesaid co-pending application.

A shear pin coupling 158 has one-half thereof keyed to shaft 140 and the other half of the coupling keyed to feed shaft 160 whereby the latter is driven.

The dog drum 169 which controls most of the automatic operations in the machine is actuated from the feed shaft 160 by means of a bevelled pinion 161 keyed thereon and meshing with the beveled gear 162 keyed on shaft 163 having a worm 164 thereon meshing with the worm gear 165 which is fastened to an end of the control drum rotatably mounted on an electric switch carrier 166.

Dogs 173 may be inserted through and fastened in the elongated slots 174 in drum 169 and when so inserted act upon switches 175, which are held in carrier 166, as the drum is rotated. The ratio of gearing between shaft 160 and drum 169 is such that drum 169 makes one revolution for one cycle of the machine, and through dogs 173 and switches 175 control automatically the various functions of the machine in a way described in my aforesaid co-pending application.

It may be desirable to rotate feed shaft 160 by hand for obvious purposes, and to this end is provided gear 176 keyed to shaft 163, and therefore directly connected with shaft 160, Fig. 2. A pinion 177, fast on slidable crank handle shaft 177a, when shifted into mesh with gear 176 operated by dog drum and feed shaft and pushes rod 180 of switch 181 to open latter and prevent power operation of shaft 160 while pinion 177 engages gear 176, switch 181 being biased to closed position.

The turret slide 226 is mounted on ways 227 and 228 carried by the bed or frame 100a of the machine (Figure 1).

The turret slide may be operated by cam 213, as shown in Figs. 3 and 4, or by any other suitable means. In the present construction the cam 213 is illustrated as a cylindrical drum having a cam path 214. The cam 213 is supported by end members 210 and 210a which in turn are rotatably mounted on studs 211 and 217, respectively, carried by the frame 100a. The cam 213 is driven from the feed shaft 160 through a bevel pinion 205 fast thereon meshing with a bevel gear 206 fast to end of shaft 207 carrying worm 208 to drive worm gear 209 secured to member 210 on one end of cam 213. Shaft 207 is provided with bevel gear 220 meshing with a bevel gear 221 on shaft 222 and to the other end of which is affixed bevel gear 223 meshing with bevel pinion 224 on shaft 225; and through shaft 225 power can be applied to various subsidiary slides.

The turret slide 226 is provided with a subslide 231 (Figures 5 and 6), adjustable longitudinally in slide 226 by screw 232 threaded in lug 233, and which may be clamped in its adjusted position by bolts 234 and clamps 235. Fixed on slide 231 is stud 236 carrying cam roll 237 which travels in cam path 214 on drum 213 (Figures 3 and 4), and thus the slide 226 is moved to and from the spindle by the rotation of drum 213. Fine adjustment of the position of the slide 226 with respect to the work may be obtained by adjustment of the slide 231 by means of the adjusting screw 232 (Figs. 5 and 6).

A turret 238 is provided with the usual tool sockets 238a and has a central bore therein receiving hollow sleeve 239, keyed at its lower end in boss 240 of slide 226, by means of which the turret is rotatably mounted on the slide 226 (Figs. 6 and 7). Turret 238 is also provided with an annular tapered seat 241 which co-acts with a complemental seat in slide 226, thus providing a seat for the turret 238 on this outer face of the slide, when the turret is clamped in position. The rotation, or indexing, of the turret is upon sleeve 239 and, therefore, bearing 241 is not subject to wear from the rotation of the turret.

One or more locking pins 242 is fixed in the slide 226 at the turret seat 241 and projects beyond the surface thereof. In the seating surface of the turret 238 are a number of bushings 243 (the number of bushings corresponding with the number of faces of the turret) to co-act in sequence with pins 242 for locking the turret in its indexed position.

In order to index the turret, it is necessary to elevate it so that bushings 243 clear locking pins 242 and, after it has been indexed to reseat the turret on seat 241 with locking pins 242 projecting into bushings 243. This is accomplished as follows:

A stud 244 is slidably, but not rotatably mounted in sleeve 239, and is reduced at its upper end to provide a shoulder 245. A washer 246 surrounds the reduced end of the stud 244 and has its periphery fixed in a groove in the turret 238. This washer may be clamped by a nut 248 threaded on reduced end of stud 244. When the stud 244 is raised, shoulder 245 engages the washer 246 and raises the turret. The cap 247 of the turret is firmly held in the position shown on stud 244 by a nut 249 threaded on the extremity of said stud. Conversely, when stud 244 is lowered, nut 248 coacts through washer 246 to return the turret to its seat 241. Also stud 244 has a pin 250 transversely located in its lower end. The ends of the pin 250 protrude through slots 251 in sleeve 239 and are acted upon by cam path 252 in the hub of gear 253 journalled on the sleeve 239 and resting on the boss 240, whereby rotation of this gear 253 first raises stud 244 and then lowers it. The gear 253 meshes with and is driven by gear 254 on spider 255 which indexes the turret.

This spider 255 carries two Geneva arms 256 and 257, which by co-acting with the slots 258 in the Geneva plate 259 fastened to the turret 238 indexes the latter, there being two indexes for every revolution of spider 255. Fastened to spider 255 is a worm gear 260 driven by worm 261 on a shaft 262 keyed to armature 263 of a motor 264. When this motor is actuated, the turret 238 is first raised from its seat and from the locking pin, then indexed, and then pulled back into position. A disc 265 is also keyed to shaft 262, and with which a brake shoe 266 coacts under bias of spring 267 (Figures 7 and 8). A solenoid 268, in parallel with the solenoid 406 of motor 264, is energized and releases the brake 266, when the motor is started, and spring 267 sets the brake when the motor is stopped.

The motor, and therefore the index movement, is started at any desired position manually by a push button 479—H (Figure 1) and/or automatically by a dog 272 on the slide drum 213 (Fig. 4), as described in my co-pending application aforesaid, and the Geneva spider 255 by means of pins 269 and 269a co-acting with the normally closed switches 270 and 270a (Figures 5 and 7) stops the motor after the Geneva plate has made one-half revolution.

The indexing of turret preferably takes place at a certain position of the tool slide 226, and with the tool slide at rest preferably in the backmost position. For accomplishing this, switches 271 and 478 (see Figure 4) are provided with which a dog 272 on cam drum 213 co-acts, and by means of which the feed shaft 160 and the tool slide 226 are brought to rest in a manner hereinafter described.

Turret indexing control

As the turret slide 226 is being returned to its rear or back position, shown in Figure 1, by the high speed motor 144, with switch 407 closed by relay 411 and interlocks 406—2 and 406—3 closed by reason of the switch relay 406 of the turret motor 264 being de-energized, the turret 238 is rotated or "indexed" at a desired position in its travel by motor 264 through a Geneva movement mechanism 255. This indexing must take place, however, when the turret slide 226 and hence the turret slide drum 213 are at certain positions in its stroke; and, while the indexing is taking place, the drum 213 may be stopped in certain cases—for instance, where a cam dwell can not be employed to allow the cam drum to continue revolving without moving the slide.

To this end, a dog 272 on the turret slide cam drum 213 (rotating clockwise as viewed in the diagram of Figure 10), at sometime before the turret slide reaches, preferably, its rearmost position, closes switch 271 (Figs. 4 and 10) which is normally urged to open position (as is the switch 478). This energizes relay 477, from the A. C. automatic control line 427, thus closing the holding circuit interlock 477—1 and closing interlock 477—2 but does not energize relay 406, which actuates index motor switch 403, because the other switch 478, also controlled by slide cam drum 213, is in its normal open position. Now, when the turret slide reaches the desired position for indexing, dog 272 closes switch 478 energizing relay 406 thus starting the index motor 264. Th Geneva mechanism 255 starts to revolve and dog 269 thereon, first moves to allow switch 270 (normally biased to close) to close completing a holding circuit for relay 406 thus maintaining operation of index motor 264, and then allows switch 270a (normally biased to open) to open thus de-energizing relay 477 and opening the starting interlock 477—2. When Geneva mechanism 255 has made ½ revolution, thus indexing the turret 238 one station, dog 269a thereon is brought in position first to close switch 270a and then to open switch 270, and as interlock 477—1 is open (by reason of de-energizing relay 477) no circuit is established, but the holding circuit through relay 406 is broken by the opening of switch 270, thus motor 264 stops.

As hereinbefore mentioned, turret slide cam drum 213, and hence feed shaft 160, must be stopped while indexing of the turret is taking place (when the cam drum is not provided with an appropriate dwell), and feed shaft 160 and the slide 226 must start on the fast idle motion after the indexing to bring the tools forward to work-performing or cutting position. For this purpose relay 406 is provided with interlocks 406—1, 406—2 and 406—3 controlled thereby. When relay 406 is energized, thus starting the index motor 264, interlocks 406—2 and 406—3, which are in service lines 399 and 400, respectively, supplying current to high speed, reversible motor 144, are opened and interlock 406—1 is closed. When interlock 406—1 is closed, relay 411 is energized and closes switch 407, but this cannot start feed shaft high speed motor 144 because interlocks 406—2 and 406—3 are opened. Also relay 411 being energized, interlock 411—5 is opened, thus breaking the circuit to shaft clutch magnet 141 and disconnecting the feed shaft 160 from the spindle drive, hence the feed shaft 160 stops. After indexing has been completed and relay 406 is de-energized by switch 270 being opened by one of the turret dogs 269 or 269a, interlocks 406—2 and 406—3 are closed which starts high speed feed shaft motor 144, also interlock 406—1 opens, but the circuit is held through the relay 411 by interlocks 411—1 and 470—2 which have been closed, it being understood that interlock 470—2 was closed by relay 470, which latter was energized by the closing of interlock 411—2 when relay 411 was energized. Thus, the turret slide 226 advances in fast travel by operation of the motor 144 toward the work piece in the chuck 376 on the spindle 101.

To change from this high idling speed to the low cutting speed driven by the spindle 101, a dog on control drum 169 opens the switch 472—D which breaks the holding circuit through relay 411, thus opening holding interlock 411—1 and also opening interlock 411—2 in the circuit of relay 470 (but since relay 470 is held energized by a holding circuit through interlock 470—1 no change takes place), closing interlock 411—5 in the circuit of the magnetic clutch 141 (but causes no change since interlock 471—2 is open), opening interlock 411—3 (but causes no change since relay 471 is held energized through closed interlock 471—1), and closing interlock 411—4 which energizes the reverse relay 412 reversing the current to motor 144, thus plugging or braking its speed. When motor 144 has slowed down to a speed so that clutch armature 142 and clutch magnet 141 are running at approximately the same speed, differential switch 156 opens and breaks the circuit through relay 412 and relay 471, the latter relay thus closing interlock 471—2 causing clutch magnet 141 to be energized which then connects the feed shaft 160 to the spindle 101. The feed shaft 160 continues to be driven by the spindle until the control drum switch 473—D is closed by a dog, which starts motor 144 and cam 213 returns slide 226 to its rearmost position and, at the same time, breaks the circuit through magnet 141 by opening interlock 411—5 and the above procedure is repeated, unless a dog has been set on the drum 169 to operate switch 429—D which stops all movement of the slide 226.

When the machine has finished its cycle (i. e. tools on the various faces of the turret 238 have completed their operations on the workpiece), a dog on the drum 169 operates switch 429—D, which breaks the holding circuit through relay 470, thus opening interlock 470—3 breaking the circuit through magnet 141 disconnecting the feed shaft from the spindle, and opening interlock 470—2 which breaks the holding circuit through relay 411 and stops motor 144, by the hereinbefore described plugging circuit, if it should be running. The feed shaft is now stopped.

The feed shaft 160 can be stopped manually by opening switch 475—H which has the same effect as operating dog switch 429—D.

In "placing" or "setting up" the work in the machine, it is necessary to manually control the operation of the feed shaft 160, in its fast forward and reverse rotation, from motor 144 as well as in its slow feed rotation from the spindle. This is accomplished by the hand switches 469—H, 476—H, 474—H (arranged adjacent each other on the panel) and the hand transfer switch 425—H, which latter is first operated to close the hand control circuit 426, thus breaking the automatic circuit 427. Then by closing switch 469—H energizing relay 411, the fast speed motor 144 may be actuated forwardly, or intermittently jogged, thereby moving in fast travel to the desired position the control drum 169, the slide 226 or other instrumentalities operated by the feed shaft 160, the motor 144 stopping whenever switch 469—H is opened because the holding circuit is connected with the automatic line 427 which was previously broken. The closing of switch 476—H energizes the reverse relay 412 actuating motor 144 in the reverse direction in the same manner.

With the transfer switch 425—H connected to hand control line 426, a relay 428 is energized which closes interlock 428—3. Now the slow cutting motion of the feed shaft 160 may be started manually by closing switch 474—H, energizing relay 470 which closes interlock 470—1 establishing holding circuit therethrough, as well as through previously closed interlock 428—3. At the same time, relay 470 closes interlock 470—3 establishing a circuit in the magnetic clutch 141, which thus connects shaft 160 to spindle drive and which continues until the normally closed switch 475—H is manually opened, thus breaking the circuit through relay 470 which opens holding circuit interlock 470—1 and which also opens interlock 470—3 in the circuit of the magnetic clutch 141, resulting in the spindle 101 being disconnected from the feed shaft 160. As dog operated switch 429—D has been shunted by interlock 428—3, opening this switch automatically will not stop the feed, as the holding circuit of relay 470 is maintained through interlocks 428—3 and 470—1.

As the indexing starting circuit (through switches 271 and 478) and the starting circuit of motor 144 (through interlocks 406—1) are from the automatic control lines 427, no indexing will take place when motor 144 is energized by reversing switch 408 being closed and when relay 412 is energized, because this relay is hand controlled only from hand control line 426.

For manual indexing, when hand transfer switch 425—H is in the position connecting line 426 for manual control, there is provided a push-button 479—H which, when closed, completes a starting circuit from manual control line 426 through relay 406, and as holding circuit for relay 406 is through switch 270 (which closes when turret dogs 269 or 269a are out of contact therewith) indexing takes place.

For braking the indexing motor 264, there is provided a disc 265 keyed to shaft 262 with which a brake shoe 266 normally co-acts under the tension of spring 267 (Figs. 7 and 8). A solenoid 268 is in parallel with starter relay 406 (Fig. 10) and releases brake 266 when energized. Therefore brake 266 is operative when relay 406 is inoperative, and vice versa.

*Hand transfer switch*

As hereinbefore stated, it is essential that the machine be controlled either automatically or by hand. Therefore, if hand operation of the machine is desired, hand transfer switch 425—H is placed in a position connecting the hand control line 426 with the main A. C. supply line 417, thus cutting off the current from the automatic A. C. control line 427. By energizing the line 426, the relay 428 is energized which opens the normally closed interlocks 428—1, 428—2 and 428—4 which disconnects the control of the high speed feed shaft motor 144 from the automatic control line 427 and prevents energization of this line by back circuits, and also closes the normally opened interlock 428—3 to provide a shunt across the dog control drum switch 429—D to render it inoperative. As the hand push-buttons 424—H, 469—H, 474—H, 476—H, 479—H (Figs. 1 and 10) are in the circuit of either the A. C. supply line 417 or the hand control line 426 which are now alive, and as the control drum operated switches 473—D, 472—D, 429—D are in the circuit of the automatic control line 427 which is now dead, the control is by hand alone.

Should hand transfer switch 425—H be thrown into the automatic control, line 427 is electrically connected with and supplied from the A. C. supply line 417, thus becoming energized, and at the same time, hand control line 426 is disconnected from the A. C. supply line 417 and becomes dead. This de-energizes relay 428, closing interlocks 428—1, 428—2 and 428—4, and opening interlock 428—3. As the control drum operated switches above mentioned are all in circuit with the automatic control line 427, which is now alive, the control is through these switches which are automatically operated by dogs on control drum 169. As all the hand operated switches— with the exception of push-button 476—H (which controls the reverse operation of the high speed feed shaft motor 144 through relay 412 and reversing switch 408, which motor must not be operated in reverse, except for plugging, when under automatic control) and push-button 479—H (which starts the turret index and which index should not be started by hand when under automatic control)—are in circuit with the A. C. supply line 417 which is alive, control is also by hand as well as automatic. It is also to be noted here that, to operate the high speed motor 144 in reverse to reverse the reciprocating movement of the turret slide the relay 412 must be energized through hand switch 476—H which is not effective unless hand transfer switch 425—H is thrown to the left, and that the switch 425—H must be thrown back to the right to render the turret operating control means 477 effective. This affords the advantage that reversal is prevented when the turret indexing means is operated.

The feed shaft 160 can be stopped manually by opening switch 475—H which has the same effect as dog switch 429—D.

Having thus described the invention and the manner in which the same is performed, it is to be understood that the exact construction, combination and arrangement of parts may be modified and varied within the scope of the appended claims.

What is claimed is:

1. In an automatic turret lathe, the combination of a turret slide, a turret on said slide, a motor for indexing the turret, means for operating the turret slide including a member for reciprocating the slide, means for controlling the operation of the turret slide and actuated synchronously with the slide operating means, means actuated by said slide reciprocating member for starting the turret indexing means at a predetermined position of the slide, and means controlled by the indexing means according to the position of the turret for stopping said turret indexing motor.

2. In an automatic turret lathe, the combination of a turret, a turret slide, a motor means for indexing the turret, other motor means for operating the turret slide, control means actuated synchronously with the slide operating means for controlling the operation of the slide, means for starting said indexing motor controlled by the slide operating means, and means controlled by the indexing means according to the position of the turret for stopping said turret indexing motor.

3. In a machine tool, the combination of a spindle and a reciprocable slide movable to and from the spindle, means for operating the slide, a turret rotatably mounted on said slide, means for indexing said turret including an electric motor, means actuated by the slide operating means for starting said electric motor when the slide is in its rearmost position from the spindle, and means controlled by the indexing means for stopping said electric motor when a face of the turret has been brought into cooperative relation with the spindle.

4. In a machine tool, the combination of a spindle, a reciprocable slide movable to and fro relatively to the spindle, means for reciprocating said slide including a rotatable element, a turret rotatably mounted on said slide, an electric motor mounted on the slide for indexing said turret, automatic means actuated by said rotatable element for starting said electric motor when the slide is in a predetermined position of its movement, and means controlled by the indexing means for stopping said electric motor.

5. In a machine tool as set forth in claim 2 further having manual operable means for starting said indexing motor means and rendering automatic starting means inoperative.

6. In a machine tool, the combination of a reciprocable slide, means for reciprocating said slide including a rotary element and a connection between said element and said slide, a turret rotatably mounted on said slide, means for indexing said turret including a motor, means controlled by said rotary element for starting said motor, means controlled by the indexing means for stopping said motor, and means cooperatively associated with said index motor starting means for stopping said rotary element, while indexing is taking place, and starting it when indexing has finished.

7. In a machine tool, the combination of a reciprocable slide, means for reciprocating said slide including a rotatable element, a turret rotatably mounted on said slide, means for indexing said turret, means for reversing the movement of said rotatable element, and means preventing such reversal when said turret indexing means is operating.

8. In a machine tool, the combination of a reciprocable slide, means for reciprocating said slide including a shaft, a turret rotatably mounted on said slide, means for indexing said turret including a motor, means for reversing said shaft, and means for rendering said index motor inoperative when said shaft is reversed.

9. In a machine tool, the combination of a reciprocable slide, a turret rotatably mounted on said slide, means for indexing said turret including a motor, means for locking said turret in its indexed position including fixed co-acting interengaging members on the turret and the slide, and means for unlocking said turret including cam means for spacially separating said turret and slide so that said fixed members do not co-act when the turret is indexed and for returning the turret and slide to locked position.

10. In a machine tool, the combination of a reciprocable slide, a turret rotatably mounted on said slide, means for indexing said turret including a motor on said slide, means for locking said turret in its indexed position including fixed co-acting interengaging members on turret and slide, means for unlocking said turret including cam means for spacially separating said turret and slide so that said fixed members do not co-act when the turret is being indexed and for returning the turret and slide to locked position, said unlocking means being actuated by said indexing motor.

11. In a machine tool, the combination of a slide reciprocable for work performing movement, a reversible means for reciprocating said slide including a rotatable element, a turret rotatably mounted on said slide, means for indexing said turret including a motor and Geneva movement driven thereby, means for locking said turret in its indexed position including fixed co-acting members in turret and slide, means for separating said turret and slide so that said fixed members do not co-act whereby the same may be unlocked for turret indexing, means for starting said motor only at a preselected position of said slide, manual means for starting said motor, means controlled by the indexed elements for stopping said motor, means associated with said index motor for stopping said reciprocating means while indexing is taking place and starting it when indexing has finished, and means rendering said index motor inoperable when said reciprocating means is reversed.

12. An automatic turret lathe having a spindle and a slide, means for reciprocating said slide to and fro relatively to the spindle, an indexible turret mounted on said slide, mechanism for indexing said turret and including a normally inactive electric motor carried by the slide and two control switch means in a control circuit means for said motor, one of said switch means being located to be actuated by a part operated by the slide reciproacting means as the slide approaches its rearmost position in its movement for starting operation of said motor and the other actuated by the indexing mechanism to stop said motor when the turret has reached a predetermined indexed position.

13. An automatic turret lathe as set forth in claim 12 wherein there is an electric motor to drive the slide reciprocating means for fast idle movements of the slide, and other means for driving the slide reciprocating means during the relative slower work performing movements of the slide, and an electrical control means for said fast idle movement motor, including electrical instrumentalities controlled by said index motor starter switch means for stopping said fast idle movement motor while indexing is taking place and controlled by said index motor stopping switch means for starting fast idle movement motor when indexing has finished.

MYRON S. CURTIS.